US008797339B2

(12) United States Patent
Labour et al.

(10) Patent No.: US 8,797,339 B2
(45) Date of Patent: *Aug. 5, 2014

(54) HARDWARE-ACCELERATED GRAPHICS FOR WEB APPLICATIONS USING NATIVE CODE MODULES

(71) Applicant: Google Inc., Mountain View, CA (US)

(72) Inventors: Antoine Labour, Mountain View, CA (US); Matthew Papakipos, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,696

(22) Filed: Sep. 25, 2012

(65) Prior Publication Data

US 2013/0033508 A1 Feb. 7, 2013

Related U.S. Application Data

(63) Continuation of application No. 12/267,095, filed on Nov. 7, 2008, now Pat. No. 8,294,723.

(51) Int. Cl.
*G06F 15/00* (2006.01)
*G06F 15/167* (2006.01)
*G09G 5/36* (2006.01)

(52) U.S. Cl.
USPC ............................. 345/522; 345/541; 345/545

(58) Field of Classification Search
None
See application file for complete search history.

(56) References Cited

U.S. PATENT DOCUMENTS

| 5,283,899 | A | 2/1994 | Cook et al. |
| 5,974,549 | A | 10/1999 | Golan |
| 6,128,774 | A | 10/2000 | Necula et al. |
| 6,275,938 | B1 | 8/2001 | Bond et al. |
| 6,393,538 | B2 * | 5/2002 | Murayama ..................... 711/162 |
| 6,507,904 | B1 | 1/2003 | Ellison et al. |
| 6,738,469 | B1 * | 5/2004 | Peirce et al. ............. 379/218.01 |
| 7,984,511 | B2 | 7/2011 | Kocher et al. |

(Continued)

FOREIGN PATENT DOCUMENTS

| CN | 101067827 A | 11/2007 |
| EP | 1681656 A1 | 7/2006 |

(Continued)

OTHER PUBLICATIONS

Erlingsson, U. et al., "XFI: Software guards for system address spaces," *OSDI '06: 7th Symposium on Operating Systems Design and Implementation*, pp. 75-88, USENIX Association, Nov. 2006.

(Continued)

*Primary Examiner* — Kee M Tung
*Assistant Examiner* — Michelle Chin
(74) *Attorney, Agent, or Firm* — Sterne, Kessler, Goldstein & Fox P.L.L.C.

(57) ABSTRACT

Some embodiments provide a system that executes a web application. During operation, the system loads the web application in a web browser and loads a native code module associated with the web application into a secure runtime environment. Next, the system writes a set of rendering commands to a command buffer using the native code module and concurrently reads the rendering commands from the command buffer. Finally, the system renders an image for use by the web application by executing the rendering commands using a graphics-processing unit (GPU).

22 Claims, 4 Drawing Sheets

(56) References Cited

U.S. PATENT DOCUMENTS

| | | |
|---|---|---|
| 2003/0126311 A1 | 7/2003 | Kushnirskiy et al. |
| 2003/0140179 A1 | 7/2003 | Wilt et al. |
| 2004/0123117 A1 | 6/2004 | Berger |
| 2006/0114260 A1* | 6/2006 | Diard .................... 345/505 |
| 2006/0174077 A1 | 8/2006 | Abadi et al. |
| 2007/0244990 A1 | 10/2007 | Wells |
| 2007/0283324 A1 | 12/2007 | Geisinger |
| 2008/0036763 A1 | 2/2008 | Chen et al. |
| 2008/0042923 A1 | 2/2008 | De Laet |
| 2008/0083030 A1* | 4/2008 | Durham et al. ............ 726/22 |
| 2008/0104195 A1 | 5/2008 | Hawkins et al. |
| 2008/0139301 A1 | 6/2008 | Holthe |
| 2008/0144903 A1 | 6/2008 | Wang et al. |
| 2009/0002380 A1 | 1/2009 | Langyel et al. |
| 2009/0119578 A1* | 5/2009 | Relyea et al. ............ 715/234 |
| 2009/0122062 A1 | 5/2009 | Kilpatrick |
| 2009/0222925 A1 | 9/2009 | Hilaiel et al. |
| 2009/0282474 A1 | 11/2009 | Chen et al. |
| 2009/0282477 A1 | 11/2009 | Chen et al. |
| 2010/0013842 A1 | 1/2010 | Green et al. |
| 2010/0066747 A1* | 3/2010 | Diard .................... 345/502 |
| 2010/0118038 A1 | 5/2010 | Labour |
| 2010/0118039 A1 | 5/2010 | Labour |

FOREIGN PATENT DOCUMENTS

| | | |
|---|---|---|
| EP | 1 921 584 A2 | 5/2008 |
| JP | 2002/108600 A | 4/2002 |
| JP | 2008/123519 A | 5/2008 |
| WO | WO 01/80098 A2 | 10/2001 |
| WO | WO 2006/114898 A1 | 11/2006 |
| WO | WO 2008/040123 A1 | 4/2008 |

OTHER PUBLICATIONS

Ford, B., "VXA: A Virtual Architecture for Durable Compressed Archives," *Proceedings of the 4th Conference on File and Storage Technologies*, 14 pages, USENIX Association, Dec. 2005.

McCamant, S. and Morrisett, G., "Evaluating SFI for a CISC Architecture," *USENIX-SS '06: Proceedings of the 15th USENIX Security Symposium*, USENIX Association, 16 pages, 2006.

Necula, G.C., "Proof-Carrying Code," *Proceedings of the 24th ACM Symposium on Principles of Programming Languages*, 14 pages, ACM, 1997.

Prasad, V., "Locating system problems using dynamic instrumentation," *Proceedings of the Ottawa Linux Symposium*, pp. 49-64, Jul. 2005.

Stegmaier, S. et al., "A Generic Solution for Hardware-Accelerated Remote Visualization," *Joint Eurographics—IEEE TCVG Symposium on Visualization*, The Eurographics Association, 9 pages, 2002.

Wahbe, R. et al., "Efficient Software-Based Fault Isolation," *Proceedings of the Symposium on Operating System Principles*, 14 pages, ACM, Dec. 1993.

International Search Report and Written Opinion mailed Jun. 21, 2010 in International Application No. PCT/US2009/063223, Korean Intellectual Property Office, Republic of Korea.

International Search Report and Written Opinion for International Application No. PCT/US2009/063226, Korean Intellectual Property Office, Republic of Korea, mailed on Jun. 10, 2010.

International Search Report and Written Opinion for International Application No. PCT/US2009/049678, Korean Intellectual Property Office, Republic of Korea, mailed on Feb. 17, 2010.

English language abstract of Japanese Patent Pubilcation No. JP 2002/108600 A, European Patent Office Espacenet Patent Search, http://worldwide.espacenet.com/.

English language abstract of Japanese Patent Publication No. JP 2008/123519 A, European Patent Office Espacenet Patent Search, http://worldwide.espacenet.com/.

Supplementary European Search Report, dated May 24, 2013, European Patent Application No. 09825330.5, European Patent Office, Netherlands.

Chinese Office Action (with English-Language Translation) directed to related Chinese Patent Application No. 200980150261.9, mailed Jul. 2, 2013; 18 pages.

English-Language Abstract for Chinese Patent Publication No. CN 101067827 A, published Nov. 7, 2007, 1 page.

English-Language Translation for Chinese Patent Publication No. CN 101067827 A, published Nov. 7, 2007; 14 pages.

Notice of Allowance mailed Nov. 26, 2013 for U.S. Appl. No. 12/267,125, filed Nov. 7, 2008; 7 pages.

Second Chinese Office Action (with English-Language Translation) directed to related Chinese Patent Application No. 200980150261.9, mailed Mar. 18, 2014; 27 pages.

* cited by examiner

HARDWARE-ACCELERATED GRAPHICS FOR WEB APPLICATIONS USING NATIVE CODE MODULES

RELATED APPLICATION

The subject matter of this application is related to the subject matter in a co-pending non-provisional application by inventor Antoine Labour entitled "Command Buffers For Web-Based Graphics Rendering," having serial number 12/267,125 filed on 07 Nov. 2008.

BACKGROUND

1. Field

The present embodiments relate to techniques for executing applications on computer systems. More specifically, the present embodiments relate to a method and system for executing web applications using hardware-accelerated graphics and native code modules.

2. Related Art

Computer systems often include a number of native applications that require complex three-dimensional (3D) scenes to be rendered, such as computer games and computer-aided design (CAD) systems. To render 3D scenes, these native applications may use graphics application programming interfaces (APIs) that direct calculations related to graphics rendering to dedicated graphics-processing units (GPUs). Furthermore, such native applications may include machine code that executes directly on one or more processors. The computational power provided by these processors and/or GPUs can greatly improve graphics quality and throughput Web applications, which have become more prevalent in recent years, are typically written in scripting languages that are unable to utilize low-level graphics A is that provide graphics hardware acceleration. Instead, graphics rendering for web applications is typically performed by CPUs instead of GPUs. The software-based nature of web-based graphics rendering may thus limit the graphics capabilities of web applications. Furthermore, the interpreted nature of scripting languages may result in significantly slower execution times for web applications than for native applications. However, unlike native applications, web applications provide a number of advantages. For example, web applications are capable of executing on multiple platforms, do not require installation, and can be more secure than native applications.

The tradeoff between web application security and native graphics performance may be addressed using a browser plugin that renders graphics for web applications by interfacing with a local graphics hardware device (e.g., a GPU). Such a plugin may correspond to a complex software system that includes various mechanisms for obtaining scene information from the web applications; storing the scene information; processing the scene information using transforms, effects, and shaders; and sending commands to the graphics hardware for rendering the scene. Furthermore, the processing demands of the plugin may require the plugin to be implemented using native code, which is traditionally insecure. Consequently, the plugin itself may include a number of potential security vulnerabilities that may be exploited by other applications and/or bugs that may lead to system failures.

Hence, what is needed is a mechanism for safety executing native code fix web-based graphics rendering while maintaining communication between the native code and graphics hardware.

SUMMARY

Some embodiments provide a system that executes a web application. During operation, the system loads the web application in a web browser and loads a native code module associated with the web application into a secure runtime environment. Next, the system writes a set of rendering commands to a command buffer using the native code module and concurrently reads the rendering commands from the command buffer. Finally, the system renders an image for use by the web application by executing the rendering commands using a graphics-processing unit (GPU).

In some embodiments, the system also validates the native code module prior to loading the native code module into the secure runtime environment.

In some embodiments, the system also displays the image within the web browser.

In some embodiments, the system also writes buffer data associated with the rendering commands to a shared memory buffer using the native code module and further renders the image by reading the buffer data from the shared memory buffer.

In some embodiments, the shared memory buffer and the command buffer are implemented using an inter-module communication (IMC) buffer.

In some embodiments, the rendering commands are further executed using at least one of a trusted code module and a rendering engine.

In some embodiments, the web application is associated with at least one of a scenegraph renderer, a graphics library, a game engine, a game, a digital content creation (DCC) tool, a video processing application, and an image processing application.

In some embodiments, executing the rendering commands involves:
(i) storing a subset of the rendering commands associated with a component in the image;
(ii) updating a set of parameters associated with the stored subset of the rendering commands; and
(iii) using the stored subset of the rendering commands and the updated parameters to render the component in the image.

DETAILED DESCRIPTION

Figure 1:
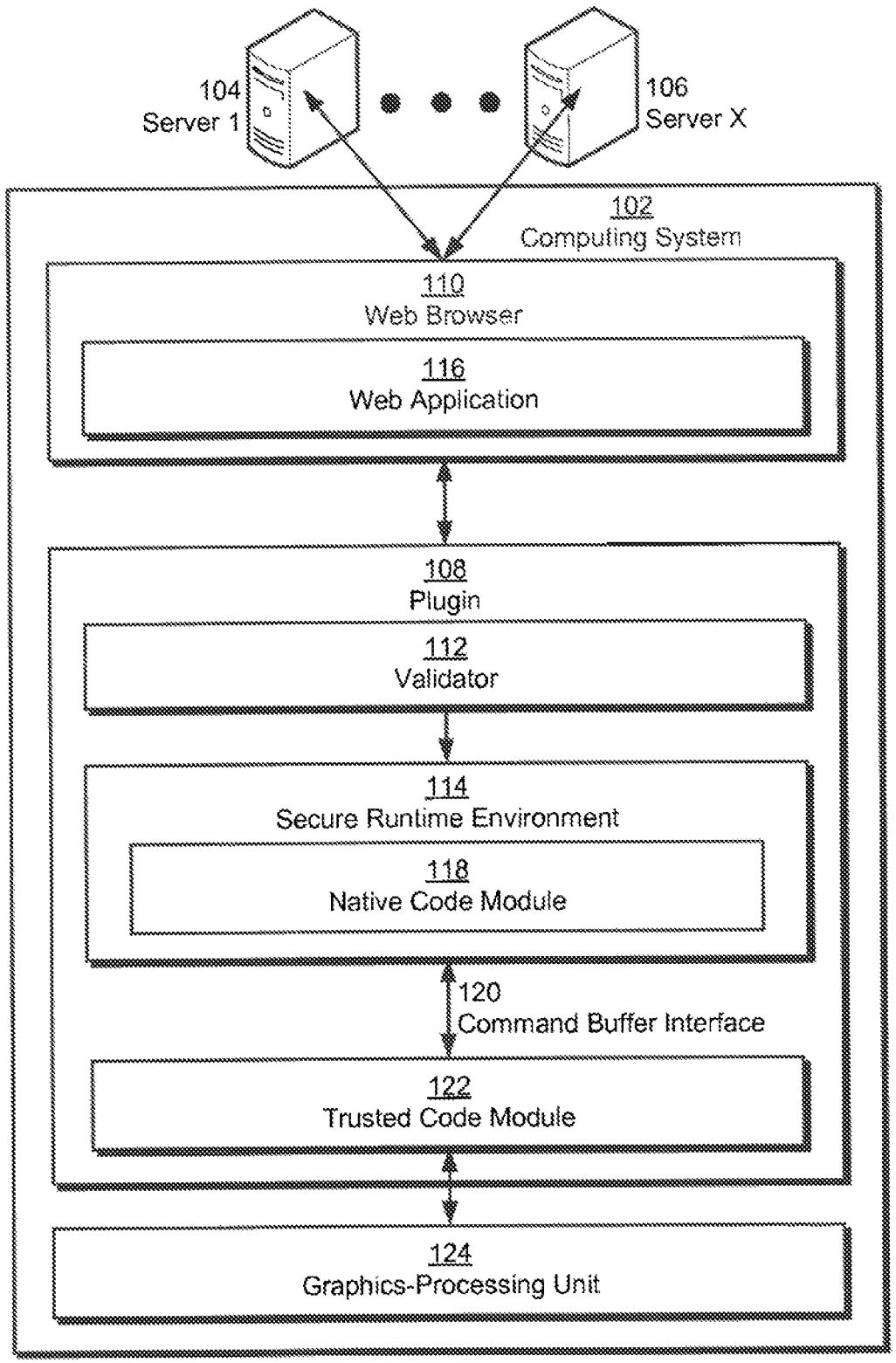
FIG. 1 shows a schematic of an embodiment of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for executing a web application. The web application may be loaded in a web browser and executed on a computing system such as a personal computer (PC), a mobile phone, a personal digital assistant (PDA), a graphing calculator, a portable media player, a global positioning system (GPS) receiver, and/or another electronic computing device. The web application may be obtained by the computing system from a server using a network connection with the server. For example, the web application may be downloaded over the Internet from a website.

More specifically, embodiments provide a method and system for rendering graphics for the web application. A native code module associated with the web application may be executed within a secure runtime environment within a plugin associated with the web browser. To render graphics for the web application, the native code module may issue rendering commands to a trusted code module provided by the plugin using a command buffer interface.

To use the command buffer interface, the native code module may write rendering commands to a command buffer. The trusted code module may then read the rendering commands from the command buffer and render an image for the web application by executing the rendering commands using a graphics-processing unit (GPU) on the computing system. The native code module may additionally store rendering commands associated with components in the image for future issuance of the rendering commands with updated parameters. For example, the native code module may issue rendering commands to animate a model across frames of the image by writing the same rendering commands for the model to the command buffer using updated parameters for each frame of the animation. Consequently, embodiments may allow web applications to securely implement graphics libraries, scenegraph renderers, computer games and game engines, video editing and photo editing features, and/or digital content creation (DCC) tools.

FIG. 1 shows a schematic of an embodiment of a system. The system includes a computing system 102 and, optionally, a set of servers (e.g., server 1 104, server x 106). Computing system 102 includes a web application 116 running within a web browser 110 and a plugin 108. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory. I/O components, wireless transmitter, etc.) on computing system 102 from the operating system, as well as interact with the user through a hardware and/or software framework provided by the operating system, as described below.

Those skilled in the art will appreciate that computing system 102 may include functionality to execute both native applications and non-native applications. In other words, computing system 102 may include native applications, such as web browser 110, that are locally installed on computing system 102 and specific to the operating system and/or one or more hardware devices on computing system 102. Such applications may be compiled into native (e.g., machine) code that executes directly on one or more central processing units (CPUs) of computing system 102. Code execution for such applications may further be optimized by writing the applications in a combination of general-purpose programming languages (e.g., C, C++, etc.) and assembly language, as well as utilizing libraries that provide hardware acceleration (e.g., graphics hardware acceleration) to the applications. However, the installation of native applications may compromise the security of computing system 102 and private data stored on computing, system 102.

Computing system 102 may also include functionality to execute platform-independent, non-native applications. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110. Alternatively, non-native applications may be obtained from other sources, such as a disk.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, etc.) associated with computing, system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

In particular, web application 116 may be unable to utilize graphics hardware acceleration (e.g., from graphics-processing unit (GPU) 124) in graphics rendering. For example, web application 116 may be written in a language (e.g., Javascript) that lacks an interface with GPU 124. Instead, graphics rendering for web application 116 may be performed using software that executes on a CPU of computing system 102 rather than GPU 124. As a result, graphics in web application 116 may be suboptimal compared to graphics in native applications that employ graphics hardware acceleration.

Limitations in graphics rendering for web application 116 may further preclude web application 116 from providing features that utilize significant graphics-processing resources, including graphics hardware acceleration. These features may include, but are not limited to:

Graphics libraries: Direct3D (Direct3D™ is a registered trademark of Microsoft Corp.), OpenGL (OpenGL™ is a registered trademark of Silicon Graphics, Inc.), etc.

Game engines and/or computer games that provide real-time 3D computer graphics to game players Scenegraph rendering systems for three-dimensional (3D) computer graphics Digital content creation (DCC) and/or computer-aided design (CAD) tools Video editing features Photo editing features In other words, web application 116 may be unable to efficiently implement features that require computationally intensive (e.g., hardware-accelerated) rendering of graphics because of the inability to access GPU 124 from web application 116.

To enable graphics support and graphics hardware acceleration for web applications, operations related to graphics processing may be offloaded to a plugin 108 in computing system 102. Plugin 108 may expose the capabilities of GPU 124 to web application 116, thus allowing web application 116 to utilize graphics hardware acceleration, including the application of vertex and pixel shaders. Plugin-based graphics hardware acceleration for web applications is described in a co-pending non-provisional application by inventors Robin Green, Evangelos Kokkevis, Matthew Papakipos and Gregg Tavares and filed 16 Jul. 2008 entitled "Web-Based Graphics Rendering System," having Ser. No. 12/174,586, which is incorporated herein by reference.

As shown in FIG. 1, plugin 108 includes a native code module 118 and a trusted code module 122. The interaction of native code module 118 and trusted code module 122 may allow plugin 108 to provide graphics hardware acceleration for web application 116. Furthermore, the validation of native code module 118 by a validator 112 in plugin 108 and the execution of native code module 118 within a secure runtime environment 114 in plugin 108 may facilitate the safe execution of rendering commands for web application 116 by GPU 124, as discussed in further detail below.

Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an intrusted Native Code Module on a Computing Device," having Ser. No. 12/117,650, and filing date 8 May 2008, which is incorporated herein by reference.

Furthermore, because native code module 118 may include binary code that runs directly on hardware, native code module 118 may be platform independent with respect to the operating system of computing system 102, web browser 110, and/or other software components on computing system 102. As described in the above-referenced applications, plugin 108 and/or native code module 118 may also include mechanisms for executing on a variety of instruction set architectures, including the use of "fat binaries" and binary translators.

More specifically, native code module 118 may correspond to a software module containing native code that runs directly on hardware provided by computing system 102, such as a CPU. As a result, native code module 118 may be used to perform tasks that require substantial access to CPU resources on computing system 102, including high-level graphics-rendering capabilities, to web application 116. For example, native code module 118 may implement a scene-graph renderer for web application 116. Alternatively, native code module 118 may securely implement a lower-level rendering engine such as an OpenGL or Direct3D library within secure runtime environment 114.

Furthermore, some or all of web application 116 may execute within native code module 118. For example, web application 116 may correspond to a 3D computer game that runs within web browser 110. As a result, web application 116 may include one or more native code modules that simulate physics in the computer game and/or one or more native code modules that render real-time 3D graphics in the computer game.

As mentioned previously, native code module 118 may interact with trusted code module 122 to provide graphics hardware acceleration to web application 116. More specifically, native code module 118 may receive graphics rendering requests from web application 116 through a graphics (e.g., scenegraph) interface with web application 116. The graphics interface may allow native code module 118 to obtain and/or store a graphics model to be rendered for web application 116. The graphics model may include, for example, a set of shapes composed of triangles or polygons, one or more light sources, a camera, and/or one or more rendering effects (e.g., shaders, culling, blending, etc.). As described in the above-referenced application(s), the graphics model may additionally be stored in one or more data structures, such as scenegraphs, buffers, and/or effects.

However, the execution of native code module 118 within secure runtime environment 114 may prevent native code module 118 from accessing hardware devices on computing system 102, such as GPU 124. instead, native code module 118 may transmit a set of rendering commands to trusted code module 122 using a command buffer interface 120 with trusted code module 122. In particular, native code module 118 may function as a software client that writes rendering commands corresponding to the graphics model to a command buffer provided by command buffer interface 120. Native code module 118 may also write buffer data to a shared memory buffer provided by command buffer interface 120.

Trusted code module 122 may operate as a software service that reads the rendering commands from the command buffer and the buffer data from the shared memory buffer. Because trusted code module 122 executes outside secure runtime environment 114, trusted code module 122 may include the capability to communicate with GPU 124. As a result, trusted code module 122 may render an image for use by web application 116 by executing the rendering commands from the command buffer using a direct interface with GPU 124 and/or an interface with a rendering engine such as an OpenGL or Direct3D renderer. The rendered image may that be displayed within web browser 110 as output for web application 116. Secure web-based graphics rendering with software clients, software services, and command buffer interfaces is described in a co-pending non-provisional application by inventor Antoine Labour entitled "Command Buffers for Web-Based Graphics Rendering," having serial number 12/267,125, and filing date Nov. 7, 2008, which is incorporated herein by reference.

In one or more embodiments, the command and shared memory buffers are implemented using an inter-module communication (IMC) buffer. Transmission of rendering commands and/or buffer data between native code module 118 and trusted code module 122 using MC buffers is discussed below with respect to FIG. 2.

In one or more embodiments, native code module 118 includes functionality to store rendering commands associated with one or more components in the graphics model and/or image. Native code module may then provide the stored rendering commands to trusted code module 122 by writing the rendering commands to the command buffer without recalculating the values of the rendering commands. The rendering commands may additionally specify a set of parameters associated with the component, such as vertex buffer data, index buffer data, effect data, and/or texture data. As a result, multiple renderings of the component may be performed by writing the stored rendering commands to the command buffer and updating values for the components' parameters using the command buffer and/or shared memory buffer. The storing of rendering commands may thus improve performance by reducing the amount of processing required by native code module 118 to issue rendering commands to command buffer.

For example, a character in a computer game may be associated with two components (e.g., objects). To draw the character, native code module 118 may issue a set of rendering commands in the following sequence to the command buffer:
Set effect
Set transformation matrices for the first object
Set a vertex buffer for the first object
Draw the first object
Set transformation matrices for the second object
Set a vertex buffer for the second object
Draw the second object To animate the character (e.g., during each frame), native code module 118 may write the same rendering commands to the command buffer while changing only the parameters (e.g., transformation matrices) used in the animation. The updated parameters may be written to or stored in the command buffer, shared memory buffer, and/or a different set of buffers (e.g., vertex butlers). in other words, because the inherent structure of the rendering commands is the same, native code module 118 may store the rendering commands for the character and insert the updated parameters into the stored command buffer structure instead of recalculating the rendering commands for each frame of the animation.

Figure 2:
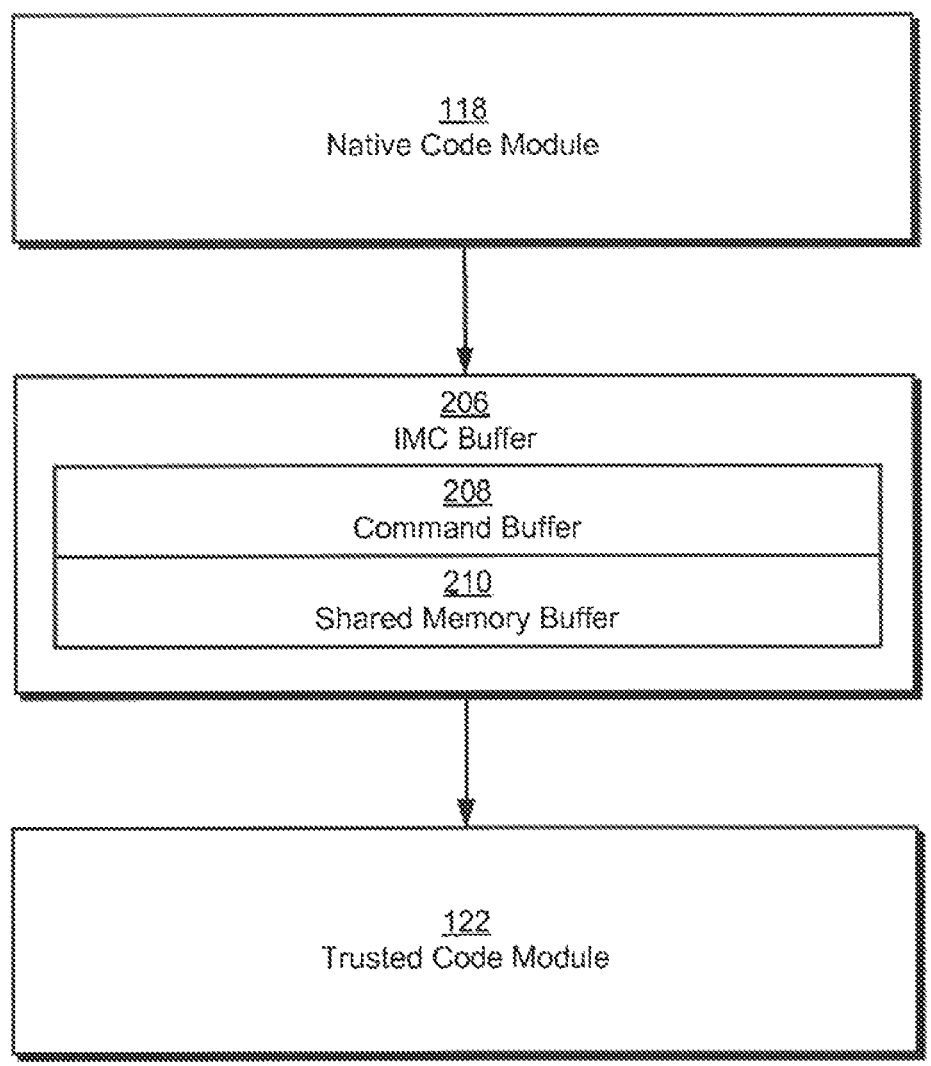
FIG. 2 shows the use of inter-module communication (IMC) buffers to facilitate interaction between a native code module and a trusted code module in accordance with an embodiment of the system.

FIG. 2 shows the use of inter-module communication (IMC) buffers to facilitate interaction between native code module 118 and trusted code module 122 in accordance with an embodiment of the system. As shown in FIG. 2, an IMC buffer 206 is configured to store a command buffer 208 and a shared memory buffer 210 for use by native code module 118 and trusted code module 122. IMC buffer 206 may be created by native code module 118 and/or trusted code module 122 during initialization and shared between native code module 118 and trusted code module 122. As a result, both native code module 118 and trusted code module 122 may map IMC buffer 206 to their respective address spaces. Furthermore, both native code module 118 and trusted code module 122 may access IMC buffer 206 through an IMC interface and/or IMC runtime. For example, native code module 118 and/or trusted code module 122 may use the IMC interface and/or IMC runtime to create command buffer 208 and/or shared memory buffer 210 within IMC buffer 206.

In addition, native code module 118 may transmit rendering commands and/or buffer data to trusted code module 122 by first accessing IMC buffer 206 through the IMC interface, then writing the rendering commands to command buffer 208 and the buffer data to shared memory buffer 210 using the command buffer interface. Similarly, trusted code module 122 may receive the rendering commands and/or buffer data by first accessing IMC buffer 206 through the IMC interface, then reading the rendering commands from command buffer 208 and the buffer data from shared memory buffer 210 using the command buffer interface.

Figure 3:
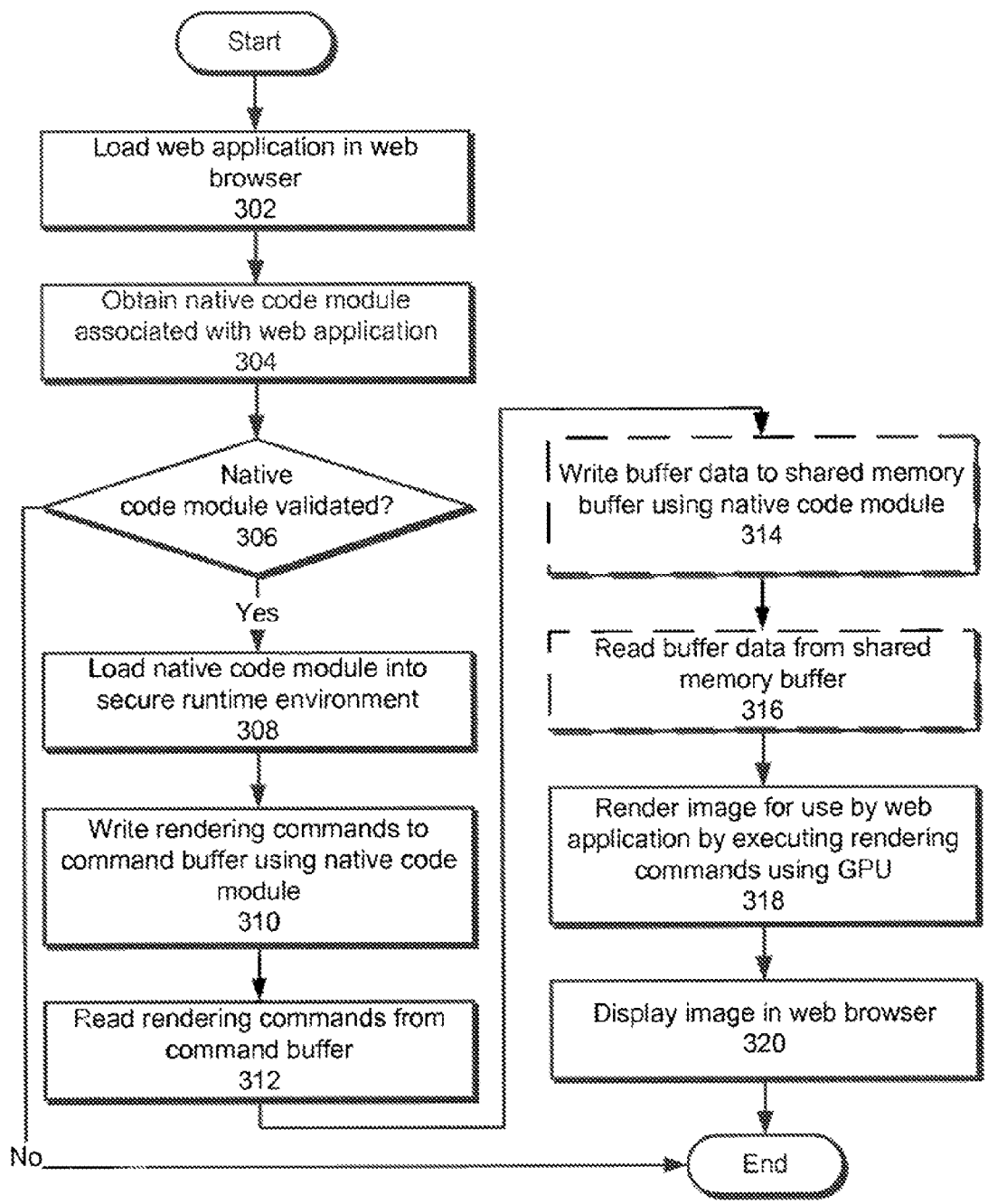
FIG. 3 shows a flowchart illustrating the process of executing a web application.

FIG. 3 shows a flowchart illustrating the process of executing a web application. In one or more embodiments, one or more of the steps may be omitted, repeated, and/or performed in a different order. Accordingly, the specific arrangement of steps shown in FIG. 3 should not be construed as limiting the scope of the technique.

Initially, a web application is loaded into a web browser (operation 302). The web application may he obtained from a server by the web browser. The web application may also utilize graphics hardware acceleration in performing tasks for a user. For example, the web application may be associated with a scenegraph renderer, a graphics library, a game engine, a game, a DCC or CAD tool, a video processing application, and/or an image processing application.

To provide graphics hardware acceleration to the web application, a native code module associated with the web application may be obtained (operation 304). For example, the native code module may be downloaded from a source specified by the web application. The native code module may also be validated Operation 306) prior to executing the native code module. If the native code module is not validated, the native code module is discarded without having been executed.

If the native code module is validated, the native code module is loaded into a secure runtime environment (operation 308). The secure runtime environment may be provided by a plugin associated with the web browser. Within the secure runtime environment, the native code module generates and writes rendering commands to a command buffer (operation 310) using a command buffer interface. (Note that the process of generating such rendering commands from a representation of an image, such as a scene graph, is well-known in the art, and any existing or future techniques for generating such rendering commands can be used.) At the same time, the rendering commands are read from the command buffer (operation 312) by an independently executing software service, such as a trusted code module. The native code module may also optionally write buffer data associated with the rendering commands to a shared memory buffer (operation 314) using the command buffer interface. The software service (e.g., trusted code module) may then read the buffer data from the shared memory buffer (operation 316).

Next, the software service may render an image for use by the web application by executing the rendering commands using a GPU (operation 318). In particular, the software service may interface directly with the GPU or access the GPU through a rendering engine such as an OpenGL or Direct3D renderer. The rendered image is then displayed in the web browser (operation 320) as output for the web application. For example, the rendered image may correspond to an updated view of a CAD model or a new frame of a computer game.

Figure 4:
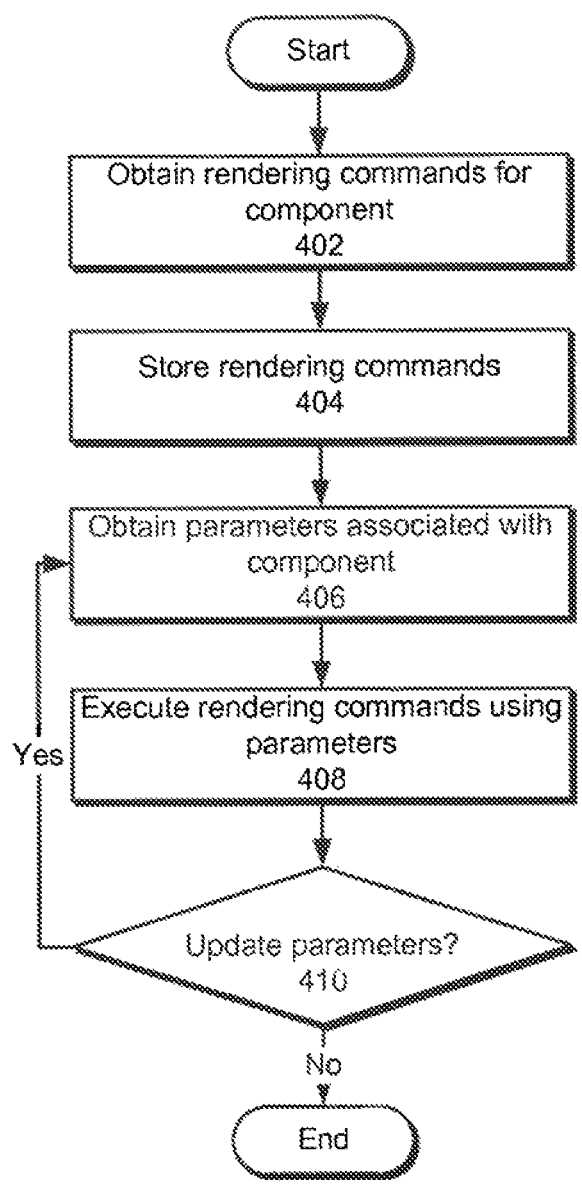
FIG. 4 shows a flowchart illustrating the process of rendering a component in an image.

FIG. 4 shows a flowchart illustrating the process of rendering a component in an image. In one or more embodiments, one or more of the steps may be omitted, repeated, and/or performed in a different order. Accordingly, the specific arrangement of steps shown in FIG. 4 should not be construed as limiting the scope of the technique.

First, rendering commands are obtained for the component (operation 402). The rendering commands may be obtained from a command buffer by a trusted code module for execution of the rendering commands. The rendering commands are also stored (operation 404). For example, the rendering commands may be stored in memory outside the command buffer for subsequent retrieval and use after the rendering commands are overwritten in the command buffer with new rendering commands.

A set of parameters associated with the component is also obtained (operation 406). For example, the component may correspond to a shape in a scenegraph or render graph with parameters that include vertex, index, texture, effect, and/or other data, The parameters may be obtained from the command buffer and/or a shared memory buffer. The rendering commands are then executed using the parameters (operation 408) to render the component in the image.

The parameters may also be updated (operation 410) for subsequent renderings of the component. For example, the parameters may be updated to animate the component in successive frames of the image. If the parameters are updated, the updated parameters are obtained (operation 406), and the stored rendering commands are executed using the updated parameters (operation 408). In other words, the updated parameters may be inserted into the stored command buffer structure associated with the rendering commands in lieu of recalculating the rendering commands with the updated parameters from the command buffer.

The parameters may continue to be updated (operation 410) and obtained (operation 406), and the stored rendering commands executed using the updated parameters (operation 408), until the component is no longer rendered in the image. For example, the stored rendering commands and parameters may be used to render and/or animate a character in a computer game until the character is hidden from view or no longer exists in the computer game.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A method for executing a web application, comprising:
loading the web application in a web browser;
loading a native code module associated with the web application into a secure runtime environment;
writing a set of rendering commands to a command buffer using the native code module;
reading the rendering commands from the command buffer using a trusted code module; and
rendering an image for use by the web application by executing the rendering commands read by the trusted code module using a rendering engine and a graphics-processing unit (GPU).

2. The method of claim 1, further comprising:
validating the native code module prior to loading the native code module into the secure runtime environment.

3. The method of claim 1, further comprising:
displaying the image within the web browser.

4. The method of claim 1, further comprising:
writing buffer data associated with the rendering commands to a shared memory buffer using the native code module; and
further rendering the image by reading the buffer data from the shared memory buffer.

5. The method of claim 4, wherein the shared memory buffer and the command buffer are implemented using an inter-module communication (IMC) buffer.

6. The method of claim 1, wherein the web application is associated with at least one of a scenegraph renderer, a graphics library, a game engine, a game, a digital content creation (DCC) tool, a video processing application, and an image processing application.

7. The method of claim 1, wherein executing the rendering commands involves:
storing a subset of the rendering commands associated with a component in the image;
updating a set of parameters associated with the stored subset of the rendering commands; and
using the stored subset of the rendering commands and the updated parameters to render the component in the image.

8. A system for executing a web application, comprising:
a web browser configured to load the web application;

a secure runtime environment configured to execute a native code module associated with the web application;

the native code module configured to write a set of rendering commands to a command buffer; and a trusted code module configured to:
read the rendering commands from the command buffer; and
render an image for use by the web application by executing the rendering commands using a rendering engine and a graphics-processing unit (GPU).

9. The system of claim 8, further comprising:
a validator configured to validate the native code module prior to executing the native code module.

10. The system of claim 8, wherein the image is displayed within the web browser.

11. The system of claim 8,
wherein the native code module is further configured to write buffer data associated with the rendering commands to a shared memory buffer, and
wherein the trusted code module is farther configured to render the image by reading the buffer data from the shared memory buffer.

12. The system of claim 11, wherein the shared memory buffer and the command buffer are implemented using an inter-module communication (IMC) buffer.

13. The system of claim 8, wherein the trusted code module is associated with the rendering engine that communicates with the GPU.

14. The system of claim 8, wherein the web application is associated with at least one of a scenegraph renderer, a graphics library, a game engine, a game, a digital content creation (DCC) tool, a video processing application, and an image processing application.

15. The system of claim 8, wherein executing the rendering commands involves:
storing a subset of the rendering commands associated with a component in the image;
updating a set of parameters associated with the stored subset of the rendering commands; and
using the stored subset of the rendering commands and the updated parameters to render the component in the image.

16. A non-transitory computer-readable storage medium storing instructions that when executed by a computer cause the computer to perform a method for executing a web application, the method comprising:

loading the web application in a web browser;
loading a native code module associated with the web application into a secure runtime environment;
writing a set of rendering commands to a command buffer using the native code module;
reading the rendering commands from the command buffer using a trusted code module; and
rendering an image for use by the web application by executing the rendering commands read by the trusted code module using a rendering engine and a graphics-processing unit (GPU).

17. The non-transitory computer-readable storing medium of claim 16, the method further comprising:
validating the native code module prior to loading the native code module into the secure runtime environment.

18. The non-transitory computer-readable storage medium of claim 16, the method further comprising:
displaying the image within the web browser.

19. The non-transitory computer-readable storage medium of claim 16, the method further comprising:
writing buffer data associated with the rendering commands to a shared memory buffer using the native code module; and
further rendering the image by reading the buffer data from the shared memory buffer.

20. The non-transitory computer-readable storage medium of claim 19, wherein the shared memory buffer and the command buffer are implemented using an inter-module communication (IMC) buffer.

21. The non-transitory computer-readable storage medium of claim 16, wherein the web application is associated with at least one of a scenegraph renderer, a graphics library, a game engine, a game, a digital content creation (DCC) tool, a video processing application, and an image processing application.

22. The non-transitory computer-readable storage medium of claim 16, wherein executing the rendering command involves:
storing a subset of the rendering commands associated with a component in the image;
updating a set of parameters associated with the stored subset of the rendering commands; and
using the stored subset of the rendering commands and the updated parameters to render the component in the image.

* * * * *